United States Patent
Hommeltoft

(10) Patent No.: US 11,912,947 B1
(45) Date of Patent: Feb. 27, 2024

(54) FLUID BED LIPID CONVERSION

(71) Applicant: Chevron U.S.A. Inc., San Ramon, CA (US)

(72) Inventor: Sven Ivar Hommeltoft, Pleasant Hill, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 18/207,356

(22) Filed: Jun. 8, 2023

Related U.S. Application Data

(60) Provisional application No. 63/417,057, filed on Oct. 18, 2022.

(51) Int. Cl.
| | |
|---|---|
| *C10L 1/02* | (2006.01) |
| *B01J 38/30* | (2006.01) |
| *B01J 8/18* | (2006.01) |
| *B01J 8/26* | (2006.01) |
| *B01J 8/22* | (2006.01) |

(52) U.S. Cl.
CPC .............. *C10L 1/02* (2013.01); *B01J 8/1827* (2013.01); *B01J 8/228* (2013.01); *B01J 8/26* (2013.01); *B01J 38/30* (2013.01); *B01J 2208/00769* (2013.01); *C10L 2230/04* (2013.01); *C10L 2290/12* (2013.01)

(58) Field of Classification Search
CPC .... C10L 1/02; C10L 2230/04; C10L 2290/12; B01J 8/1827; B01J 8/228; B01J 38/30; B01J 8/26; B01J 2208/00769
See application file for complete search history.

(56) References Cited

U.S. PATENT DOCUMENTS

| | | | |
|---|---|---|---|
| 10,947,458 B1 | 3/2021 | Liu et al. | |
| 2002/0041938 A1 | 4/2002 | Takahashi et al. | |
| 2015/0051428 A1* | 2/2015 | Dayton | C10G 1/086 585/242 |
| 2016/0108344 A1* | 4/2016 | Patience | B01J 8/24 554/167 |
| 2016/0312125 A1 | 10/2016 | Linck et al. | |

FOREIGN PATENT DOCUMENTS

WO PCT/US2023/024819  9/2023

* cited by examiner

*Primary Examiner* — Latosha Hines
(74) *Attorney, Agent, or Firm* — Michael E. Carmen; Terrence M. Flaherty

(57) ABSTRACT

A process involves (a) processing a lipid feedstock over a fluidized particulate catalyst in a gas-based stream in a fluid bed reactor to obtain a processed stream and spent catalyst comprising coke deposits, (b) continuously introducing the spent catalyst comprising the coke deposits to a catalyst regeneration unit, (c) continuously operating the catalyst regeneration unit to burn off the coke deposits from the spent catalyst to obtain a regenerated particulate catalyst, and (d) continuously introducing the regenerated particulate catalyst from the catalyst regeneration unit to the fluid bed reactor.

20 Claims, 4 Drawing Sheets

FLUID BED LIPID CONVERSION

PRIORITY

The present application claims priority to U.S. Provisional Patent Application Ser. No. 63/417,057, entitled "Fluid Bed Lipid Conversion," filed on Oct. 18, 2022, the content of which is incorporated by reference herein in its entirety.

BACKGROUND

There is an increasing interest in alternative feedstocks for replacing at least partly crude oil, in the production of hydrocarbons suitable as fuels or fuel components, for example, as transportation fuels, or compatible with fuels. Biofuels are typically manufactured from feedstock originating from renewable sources including oils and flits obtained from plants, animals, algal materials, fish, and various waste streams, side streams and sewage sludge. These feedstocks, particularly the various waste streams and side streams, contain varying amounts of contaminants, such as gums, organic chlorine compounds, phospholipids and other phosphorus compounds, metals and metal compounds, and residual soaps, which are, for example, deleterious to converting catalysts.

SUMMARY

In accordance with an illustrative embodiment, a process comprises:
(a) processing a lipid feedstock over a fluidized particulate catalyst in a gas-based stream in a fluid bed reactor to obtain a processed stream and spent catalyst comprising coke deposits,
(b) continuously introducing the spent catalyst comprising the coke deposits to a catalyst regeneration unit.
(c) continuously operating the catalyst regeneration unit to burn off the coke deposits from the spent catalyst to obtain a regenerated particulate catalyst, and
(d) continuously introducing the regenerated particulate catalyst from the catalyst regeneration unit to the fluid bed reactor.

BRIEF DESCRIPTION OF THE DRAWINGS

Through the following detailed description with reference to the accompanying drawings, the above and other objectives, features, and advantages of example embodiments of the present disclosure will become more apparent.

DETAILED DESCRIPTION

Figure 1:
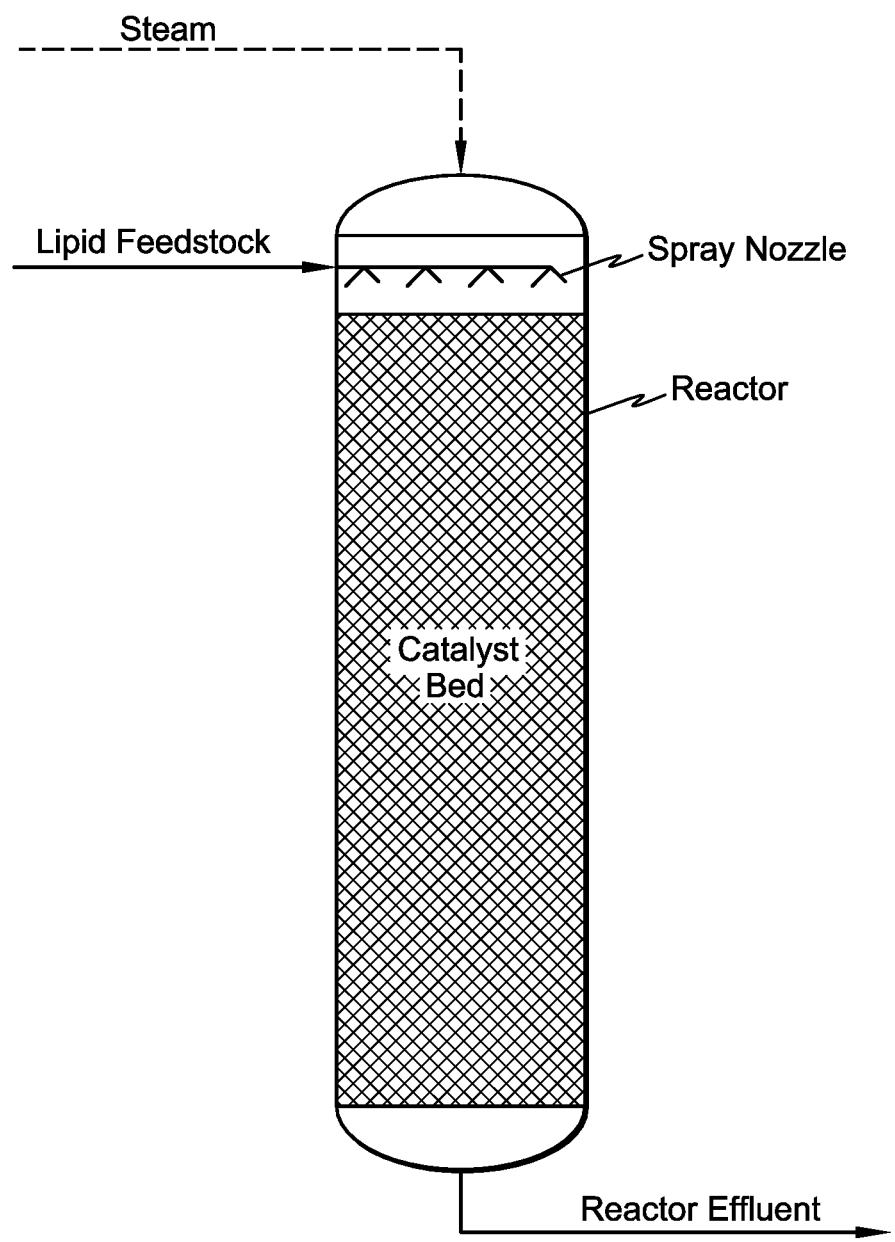
FIG. 1 illustrates a conventional reactor unit.

Various illustrative embodiments described herein are generally directed to processing of renewable feedstocks for refinery processing to produce chemicals, fuels, lubricants, or components thereof.

Definitions

The term "lipid" is known in the art and refers to fatty acids and their derivatives. Accordingly, examples of lipids include fatty acids (both saturated and unsaturated); glycerides or glycerolipids, also referred to as acylglycerols (such as monoglycerides (monoacylgycerols), diglycerides (diacylglycerols), triglycerides (triacylglycerols, TAGs, or neutral fats); phosphoglycerides (glycerophospholipids); non-glycerides (sphingolipids, sterol lipids, including cholesterol and steroid hormones, prenol lipids including terpenoids, fatty alcohols, waxes, and polyketides); and complex lipid derivatives (sugar-linked lipids or glycolipids, and protein-linked lipids).

The term "fatty acid" refers to a monocarboxylic acid having an aliphatic chain containing about 3 to about 39 carbon atoms, and more particularly about 7 to about 23 carbon atoms. The aliphatic chain may be linear or branched and may be saturated or unsaturated (e.g., contain one or more carbon-carbon double bonds).

The term "bio-oil" means a liquid product produced from biomass by a thermochemical process. Bio-oil may include bio-derived hydrocarbon fractions and oxygenated hydrocarbons such as carboxylic acids, alcohols, aldehydes, ketones, etc.

The term "spent catalyst" as used herein denotes a catalyst that has less activity at the same or similar reaction conditions (e.g., temperature, pressure, inlet flows, etc.) than the catalyst had when it was originally exposed to the process. This can be due to a number of reasons, where several non-limiting examples of causes of the catalyst having less activity include coking or carbonaceous material sorption or accumulation, steam or hydrothermal deactivation, metals (and ash) sorption or accumulation, attrition, morphological changes including changes in pore sizes, cation or anion substitution, and/or chemical or compositional changes.

The term "renewable feedstock" as used herein refers to a material originating from a renewable resource (e.g., plants) and non-geologically derived. The term "renewable" is also synonymous with the term "sustainable", "sustainably derived", or "from sustainable sources". The term "geologically derived" means originating from, for example, crude oil, natural gas, or coal. "Geologically derived" materials cannot be easily replenished or regrown (e.g., in contrast to plant- or algae-produced oils).

The term "hydroprocessing" generally encompasses all processes in which a hydrocarbon feedstock is reacted with hydrogen in the presence of a catalyst and under hydroprocessing conditions, typically, at elevated temperature and elevated pressure. Hydroprocessing includes, for example, processes such as hydrogenation, hydrodeoxygenation, hydrodesulfurization, hydrodenitrogenation, hydrodemetallization, hydrodearomatization, hydroisomerization, hydrodewaxing, hydrocracking and mild hydrocracking.

The term "transportation fuels" as used herein refer here to fractions or cuts or blends of hydrocarbons having distillation curves standardized for fuels, such as for diesel fuel (middle distillate from 160° C. to 380° C., according to EN 590), gasoline (40° C. to 210° C., according to EN 228), aviation fuel (160° C. to 300° C., according to ASTM D-1655 jet fuel), kerosene, naphtha, etc. Liquid fuels are hydrocarbons having distillation curves standardized for fuels, such as transportation fuels.

The term "ppm" as used herein means parts-per-million and is a weight relative parameter. A part-per-million is a microgram per gram, such that a component that is present at ppm is present at 10 micrograms of the specific component per 1 gram of the aggregate mixture.

The term "upgrading" refers to a process wherein a feedstock is altered to have more desirable properties.

The term "biofuels" refers here to liquid fuels obtained from renewable feedstock (e.g., feedstock of biological origin).

As mentioned above, there is an increasing interest in alternative feedstocks for replacing at least partly crude oil, in the production of hydrocarbons suitable as fuels or fuel components, for example, as transportation fuels, or compatible with fuels. Biofuels are typically manufactured from feedstock originating from renewable sources. These feedstocks, particularly the various waste streams and side streams, contain varying amounts of contaminants, such as gums, organic chlorine compounds, phospholipids and other phosphorus compounds, metals and metal compounds, and residual soaps, which are, for example, deleterious to converting catalysts.

Presently, a process for treating a low carbon intensity lipid feedstock to remove impurities and most of the oxygen to then make a product mixture that can without further treatment be processed in a conventional refinery hydrotreater uses conventional hydrotreating catalyst. This is illustrated in FIG. 1 which shows a lipid feed being fed to the reactor and introduced as a spray by a set of nozzles above a bed of catalyst. The reaction occurs in the catalyst bed and reactor effluent containing the products is removed from the bottom of the reactor. Steam may optionally be introduced at the top of the reactor as well.

In the process using the reactor depicted in FIG. 1, a lipid feed is reacted over a catalyst including an oxide in the catalyst bed. A small amount of coke is formed in the process which accumulates on the catalyst, and the coke is removed by a coke burn in air or dilute air. Any non-volatile byproducts such as metal oxides or metal carbonates dissolved in the lipid feed and formed by decomposition of the corresponding soaps in the feed are also collected on the catalyst surface or in the void space around the catalyst particles and are removed from the process stream. These metal impurities are not combusted during the coke burn and may partially accumulate on the catalyst over time and may also form dust that can accumulate in the void between the catalyst particles. The coke and these impurities lead to plugging of the reactor. In addition, the reaction temperature may also cause excessive heater surface fouling.

It would be desirable to have a process and system (e.g., reactor) that would avoid the aforementioned problems. Accordingly, the non-limiting illustrative embodiments described herein overcome these and other drawbacks in providing an improved process for purifying renewable feedstocks that allows for regeneration of the catalyst through coke burn while inhibiting or preventing coke plugging in the reactor. In non-limiting illustrative embodiments, a process comprises:
  (a) processing a lipid feedstock over a fluidized particulate catalyst in a gas-based stream in a fluid bed reactor to obtain a processed stream and spent catalyst comprising coke deposits,
  (b) continuously introducing the spent catalyst comprising the coke deposits to a catalyst regeneration unit,
  (c) continuously operating the catalyst regeneration unit to burn off the coke deposits from the spent catalyst to obtain a regenerated particulate catalyst, and
  (d) continuously introducing the regenerated particulate catalyst from the catalyst regeneration unit to the fluid bed reactor.

Lipid Feedstock

The lipid feedstocks for use in the illustrative embodiments disclosed herein originate from renewable or biological source or sources, and it is meant to include herein feedstocks oilier than those obtained from mineral oil, shale oil or coal. In an illustrative embodiment, the lip feedstock is partially decomposed and/or hydrolyzed.

In an illustrative embodiment, suitable lipid feedstocks for use herein can include, for example, from 0 to about 90 wt. % of free fatty acids, about 5 to 100 wt. % fatty acid glycerol esters (e.g., mono-, di-, triglycerides) and 0 to about 20 wt. % of one or more compounds selected from the group consisting of fatty acid esters of the non-glycerol type, fatty amides, and fatty alcohols. In an illustrative embodiment, as may be combined with the preceding embodiment, the lipid feedstock comprises more than about 50 wt. % of free fatty acids and fatty acid glycerol esters such as about 70 wt. % or more, for example, about 80 wt. % or more and up to 100 wt. %.

In an illustrative embodiment, a lipid feedstock may include lipids (e.g., fats or oils) that originate, for example, from any type of plant, animal, microorganisms such as algae (e.g., algae oil, algae biomass, algae cultivation), fish and microbiological process. In an embodiment, the lipid feedstocks used include triglycerides.

Many different lipid feedstocks derived from plants can be used. In non-limiting illustrative embodiments, plant-based lipid feedstocks can include, for example, rapeseed oil, soybean oil (including degummed soybean oil), canola oil, cottonseed oil, grape seed oil, mustard seed oil, corn oil, linseed oil, safflower oil, sunflower oil, poppy-seed oil, pecan oil, walnut oil, oat oil, peanut oil, rice bran oil, *camellia* oil, castor oil, and olive oil, palm oil, coconut oil, rice oil, algae oil, seaweed oil, Chinese Tallow tree oil. Other plant-based lipid feedstocks can be obtained from, for example, argan, avocado, babassu palm, balanites, borneo tallow nut, brazil nut, calendula, camelina, caryocar, cashew nut, chinese vegetable tallow, cocoa, coffee, cohune palm, coriander, cucurbitaceae, *euphorbia*, hemp, illipe, Jatropha, jojoba, kenaf, kusum, macadamia nuts, mango seed, nogg *abyssinia*, nutmeg, opium poppy, *perilla*, pili nut, pumpkin seed, rice bran, sacha inche, seje, sesame, shea nut, teased, allanblackia, almond, chaulmoogra, *cuphea*, jatropa curgas, karanja seed, neem, *papaya*, tonka bean, tong, and ucuuba, cajuput, clausena anisata, davana, *galbanum* natural oleoresin, gennan chamomile, hexastylis, high-geraniol monarda, juniapa-hinojo sabalero, *Melissa officinalis*, milfoil, ninde, patchouli, tarragon, and wormwood.

Many different lipid feedstocks derived from animals can also be used. In non-limiting illustrative embodiments, animal-based lipid feedstocks can include, for example, choice white grease, lard (pork fat), tallow (beef fat), fish oil, and poultry fat.

Many different lipid feedstocks derived from microorganisms (Eukaryotes, Eubacteria and Archaea) can also be used. In non-limiting illustrative embodiments, microbe-based lipid feed stocks can include, for example, the L-glycerol lipids of Archaea and algae and diatom oils. In some embodiments, lipid feed stocks derived from microorganisms can include bacteria, protozoa, algae, and fungi.

In some embodiments, lipid feedstocks derived from both plant and animal sources can be used such as, for example, yellow grease, white grease, and brown grease. In non-limiting illustrative embodiments, yellow, white or brown grease can include frying oils from deep fryers and can thus include fats of both plant and animal origin. Lipid feedstocks can specifically include used cooking oil. Brown grease (also known as trap grease) can include fats extracted from sewage systems and can thus include fats of both plant and animal origin. In some embodiments, lipid feedstocks used in embodiments can include non-biological lipid feedstocks. Lipid feedstocks of the present disclosure can also include black oil.

In non-limiting illustrative embodiments, the lipid feedstocks include feedstocks originating from low value renewable waste materials, side streams, by-products, refining waste and residues, sewage sludge, and any combinations thereof.

In non-limiting illustrative embodiments, the lipid feedstocks may be selected from the group consisting of acidulated soap-stocks, fatty acid distillates from physical refining of plant oils or animal fats, distillers corn oil (DCO) from ethanol production, waste cooking oils, lard, brown grease, yellow grease, trap grease, waste fats, low-grade oils, supercritical water liquefaction oils (SCWL oils), plant oils, animal fats and any combination thereof.

In an illustrative embodiment, as may be combined with one or more of the preceding paragraphs, the lipid feedstocks comprise one or more of alkali metals, alkaline earth metals, and/or other metals, such as iron and manganese, even in low amounts are often regarded as not suitable for catalytic treatment in refinery operations because each of the metals is an effective catalyst poison. The alkali metals, alkaline earth metals and other metals may typically comprise Na, K, Mg, Ca, Mn, Fe, or a combination thereof. In illustrative embodiments, the lipid feedstock may comprise at least about 1 ppm (e.g., about 1 to about 250 ppm, about 1 to about 1.00 ppm, about 1 to about 50 ppm, about 1 to about 25 ppm, about 2 to about 250 ppm, about 2 to about 100 ppm, or about 2 to about 25 ppm) of alkali metals, alkaline earth metals, metals of Groups VIIB and VIIIB, or combinations thereof, calculated as elemental metals, in total. Total metal content can be determined using AOCS Recommended Practice Ca 17-01.

In non-limiting illustrative embodiments, the lipid feedstocks can include low value lipid feedstocks, such as various types of animal fats and waste oils, which generally have a relatively high concentration of free fatty acids. One method of assessing the concentration of free fatty acids is to determine the total acid number (TAN) of the feedstock. The total acid number is the mass of potassium hydroxide (KOH) in milligrams that is required to neutralize one gram of the chemical substance being assessed.

In an illustrative embodiment, as may be combined with one or more of the preceding paragraphs, the lipid feedstocks may have a total acid number of at least about 5 mg KOH/g (e.g., about 5 to about 150 mg KOH/g, about 10 to about 150 mg KOH/g, from about 10 to about 100 mg KOH/g, from about 10 to about 50 mg KOH/g, from about 10 to about 25 mg KOH/g, or from about 10 to about 20 mg KOH/g). The total acid number can be determined using ASTM D664.

Lipid feedstocks typically contain varying amounts of impurities such as, for example, phosphorus, silicon, chloride, alkali metals, earth alkaline metals, other metals, etc. In an illustrative embodiment, as may be combined with one or more of the preceding paragraphs, the lipid feedstocks can contain varying amounts of chloride such as at least about 2 ppm, or at least about 4 ppm or at least about 10 ppm (e.g., about 2 to about 100 ppm, about 2 to about 75 ppm, about 2 to about 50 ppm, about 10 to about 100 ppm, or about 10 to about 50 ppm), where any of the lower limits can be combined with any of the upper limits.

In non-limiting embodiments, there can be additional lipid feedstocks present in the processing, in addition to the lipid feedstocks having a chloring content of at least about 2 ppm, that have a chloride content of less than 2 ppm. In other embodiments, there can be also be additional lipid feedstocks present in the processing, in addition to the lipid feedstocks having a chloring content of at least about 2 ppm, that have no chloride content.

In an illustrative embodiment, the lipid feedstocks may be pretreated. Suitable pretreatments include, but are not limited to, degumming, neutralization, bleaching, deodorizing, or any combination thereof.

Catalyst

In an illustrative embodiment, as may be combined with one or more of the preceding paragraphs, the particulate catalyst for use in the illustrative embodiments described herein can be a metal oxide catalyst on an oxide support. Suitable metals of the metal oxide include, for example, Na, K, Mg, Ca, Sr, Cr, Mo, Mn, Fe, Co, Ni, Cu, Zn, Al, rare earth metals, or a mixture thereof. In an illustrative embodiment, the metal oxide can be present in an amount ranging from about 0.1 to about 10 wt. %. In an illustrative embodiment, a suitable oxide support can be any suitable inorganic oxide support. Representative examples of such suitable oxide supports include, but are not limited to, alumina, silica, silica-alumina, titania, zirconia, or a mixture thereof. In one embodiment, the oxide support is one of alumina and silica-alumina where the silica content of the silica-alumina support can range from about 2 to about 30 wt. %. The alumina can be any of the aluminas conventionally used for hydroprocessing catalysts. Such aluminas are generally porous amorphous alumina having an average pore size from about 50 to about 200 angstroms.

The metal oxide catalyst may be in any of the commonly used catalyst shapes such as, for example, spheres, granules, pellets, chips, rings, extrudates, or powders that are well-known in the art.

In an illustrative embodiment, as may be combined with one or more of the preceding paragraphs, the particulate catalyst used herein is a small particulate catalyst. The term "small particulate catalyst" as used herein shall be understood to mean a catalyst having an average particle diameter of about 0.05 to about 4 millimeters (mm), or about 0.05 to about 2 mm, or about 0.06 to about 0.5 mm or even around 100 micrometer. Any of the lower limits described above can be combined with any of the upper limits.

Reaction of the Renewable Feedstock

In order to provide renewable feedstocks suitable for refinery operations, the lipid feedstock is reacted with a particulate catalyst such as a metal oxide catalyst on an oxide support under reaction conditions to produce a treated stream comprising a liquid fraction comprising a bio-oil which has a lower content of free fatty acids and impurities as compared to the lipid feedstock. The obtained bio-oil is particularly suitable as a renewable feedstock for hydroprocessing in biofuel manufacture.

Without being bound by theory, the reaction is believed to proceed by a thermochemical process which includes one of more of cracking, decarboxylation, decarboxylation-coupling, dehydration and/or deoxygenation reactions.

In an illustrative embodiment, as may be combined with one or more of the preceding paragraphs, suitable reaction conditions for the lipid feedstocks may comprise one or more of the following: a temperature in a range of from about 400° C. to about 700° C. (e.g., about 425° C. to about 650° C., or about 450° C. to about 600° C.); a pressure in a range of from 0 to about 10 MPa (e.g., about 0.1 to about 5

MPa, or about 0.1 to about 1 MN); and a liquid hourly space velocity (LHSV) in a range of from about 0.1 to about 10 h$^{-1}$ (e.g., about 0.2 to about 5 h$^{-1}$, or about 0.3 to about 3 h$^{-1}$). Any of the lower limits described above can be combined with any of the upper limits.

In an illustrative embodiment, as may be combined with one or more of the preceding paragraphs, the reaction of the lipid feedstocks with the particulate catalyst may be carried out in the presence of a gas-based stream. Suitable gases include, for example, hydrogen, nitrogen, carbon dioxide, H$_2$O (water vapor) or C$_1$-C$_4$ hydrocarbons (e.g., methane, ethane, propane or mixtures thereof). These gases may be admixed into the reaction mixture of the lipid feedstock and particulate catalyst and/or may be formed in the course of the reaction. The carrier gas may be used to expel gaseous or volatile reaction products from the product mixture such as carbon dioxide (CO$_2$) and H$_2$O (water vapor).

In an illustrative embodiment, as may be combined with one or more of the preceding paragraphs, the reaction of the lipid feedstocks with the fluidized particulate catalyst may be conducted in any suitable reactor or reactor configuration, such as a fluid bed reactor, an ebullating bed reactor, a riser reactor, or a combination of a riser and a fluid bed. The feed stream can be injected onto the catalyst in the liquid, vapor, or mixed phase. The teed stream may be introduced preheated.

In an illustrative embodiment, as may be combined with one or more of the preceding paragraphs, the process may be a continuous process.

In illustrative embodiments, the bio-oil has a lower content of oxygen and impurities as compared to the lipid feedstock.

In illustrative embodiments, the resulting treated stream comprising a liquid fraction comprising a bio-oil may have a TAN of less than 5 mg KOH/g (e.g., less than 4 mg KOH/g, less than 3 mg KOHN, less than 2 mg KOHN, or less than 1 mg/KOHN).

In illustrative embodiments, the resulting treated stream comprising a liquid fraction comprising a bio-oil may also comprise less than about 10 ppm (e.g., less than about 5 ppm, or less than about 1 ppm, or less than about 0.5 ppm) of chlorine, calculated as elemental chlorine (a Cl atom).

In illustrative embodiments, the resulting treated stream comprising a liquid fraction comprising a bio-oil may comprise less than 1 ppm of alkali metals, alkaline earth metals, metals of the Groups VIM and VIM of the Periodic Table of Elements (other metals), or combinations thereof, calculated as elemental metals, in total, preferably less than about 0.5 ppm.

In illustrative embodiments, the oxygen content of the bio-oil may be 5 wt. % or less (e.g., 3 wt. % or less, or 2 wt. % or less), on a dry basis, based on the total weight of the bio-oil.

Oxygen content can be determined using ASTM D5291. Lipid feedstocks can have an oxygen content in a range of about 10 to about 15 wt. %, on a dry basis, based on the total weight of the feedstock.

The obtained bio-oil(s), after further treatment as will be described hereinbelow, is particularly suitable as a renewable feedstock for hydroprocessing in biofuel manufacture.

Hydroprocessing

Beneficially, the bio-oils produced by the process of the illustrative embodiments disclosed herein may be used directly as a refinery feedstock. The obtained bio-oil may be blended with one or more mineral oil feedstocks originating from crude oil, shale oil or coal and likewise used as a refinery feedstock.

If desired, the bio-oils may be subjected to a catalytic hydroprocessing step. The obtained least one effluent (hydroprocessing product) may be fractionated in a fractionating step to provide hydrocarbon fractions, suitable as renewable fuels or fuel components, useful as transportation fuels, fuel components and other chemicals. The catalytic hydroprocessing step may be carried out in one step or in more than one step.

The catalytic hydroprocessing step may be carried out by processing one or more fractions (such as distillation cuts) of the bio-oil separately or the bio-oil may be processed as a whole.

The catalytic hydroprocessing may comprise at least a hydrodeoxygenation step. Catalytic hydroprocessing may comprise a hydrodeoxygenation step followed by one or more steps selected from hydroisomerization and hydrocracking steps.

Hydroprocessing may be performed using one or more hydroprocessing catalysts comprising one or more metals selected from Group VIA and Group VIII metals. Particularly useful examples are Mo, W, Co, Ni, Pt and Pd. The catalyst(s) can also contain one or more support materials, for example zeolite, alumina, alumina-silica, zirconia, alumina-silica-zeolite and activated carbon. Suitably a mixture of CoO and MoO$_3$ (CoMo) and/or a mixture of NiO and MoO$_3$ (NiMo), and/or a mixture of Ni, Mo and Co and/or NiW and one or more support materials selected from zeolite, alumina, silica, zeolite-alumina, alumina-silica, alumina-silica-zeolite and activated carbon. Also, noble metals, such as Pt and/or Pd dispersed on alumina may be used.

Hydroprocessing conditions can include a temperature of from about 1.00° C. to about 450° C. (e.g., about 200° C. to about 370° C., or about 230° C. to about 350° C.) a pressure of from about 0.5 to about 30 MPa (e.g., about 3 to about 25 MPa, or about 3 to about 12 MPa); a liquid hourly space velocity of from about 0.01 to about 10 h$^{-1}$ (e.g., about 0.1 to about 5 h$^{-1}$). The hydrogen gas treat rate can be in a range of from about 600 to about 400 Nm$^3$/m$^3$ (e.g., about 1300 to about 2200 Nm$^3$/m$^3$).

The hydroprocessing occurs in a reaction stage. The reaction stage can comprise one or more reactors or reaction zones each of which comprises one or more catalyst beds of the same or different catalyst. Although other types of catalyst beds/reactors can be used, fixed beds are preferred. Such other types of catalyst beds include fluidized beds, ebullating beds, slurry beds, and moving beds. Interstage cooling or heating between reactors, reaction zones, or between catalyst beds in the same reactor, can be employed.

At least one effluent from the hydroprocessing is drawn off from the last reactor. In one embodiment, the effluent is directed to a separator, such as any suitable separator or flashing unit. In the separator, typically water, gaseous stream comprising hydrogen, light hydrocarbons (e.g., C$_1$ to C$_5$ hydrocarbons), H$_2$S, CO and CO$_2$ are separated from the liquid component comprising >C$_5$ hydrocarbons and some C$_1$ to C$_5$ hydrocarbons. Water and gases may also be separated by other means which are well known to those skilled in the art.

The liquid hydrocarbon stream obtained from the hydroprocessing step includes fuel grade hydrocarbons having a boiling point of at most 380° C., according to ISO EN 3405. The person skilled in the art is able to vary the distilling conditions and to change the temperature cut point as desired to obtain any suitable hydrocarbon product, boiling suitably in the transportation fuel ranges.

Figure 2:
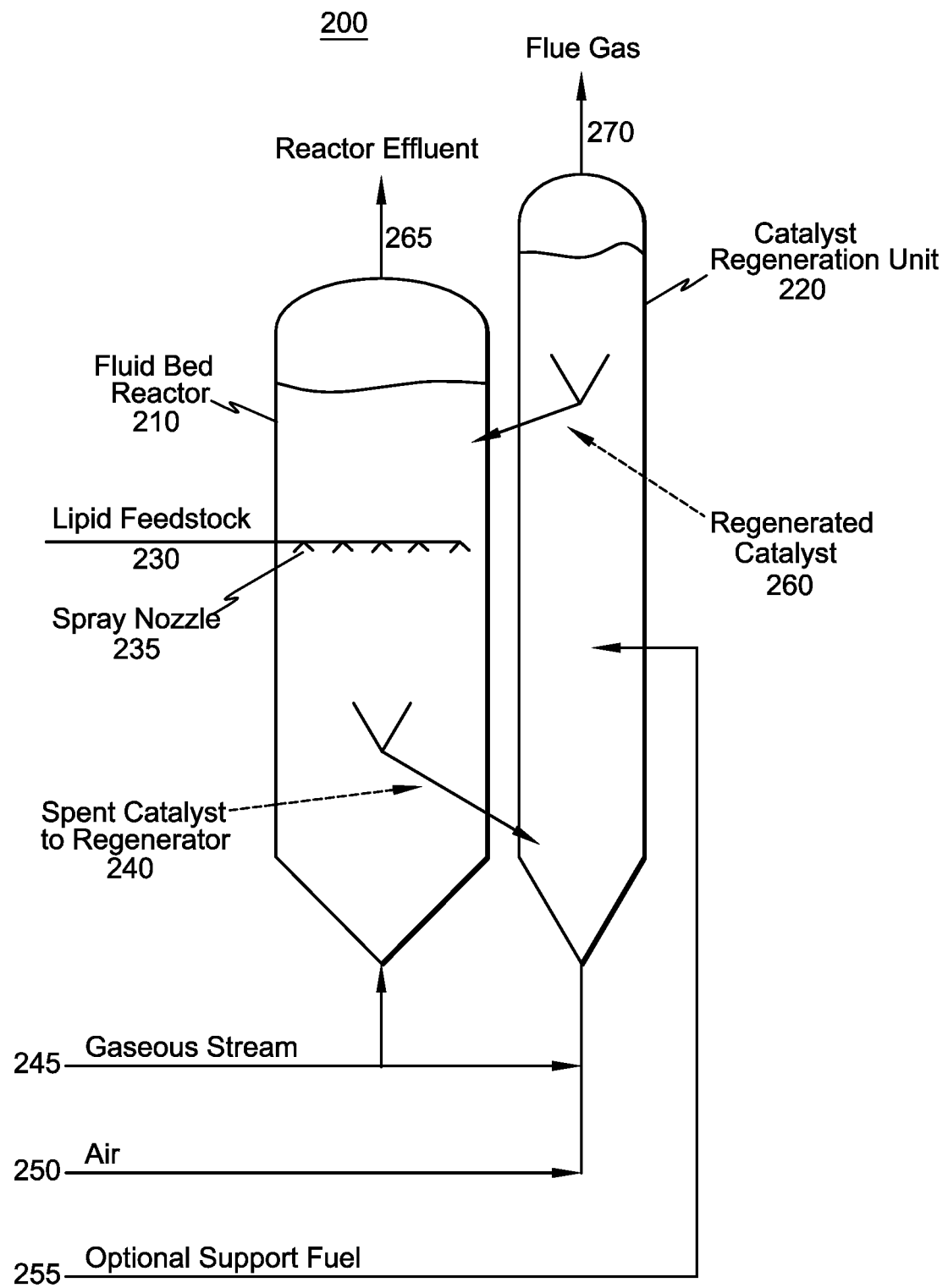
FIG. 2 illustrates a fluid bed reactor unit and a catalyst regeneration unit, in accordance with an illustrative embodiment.

The non-limiting illustrative embodiments of the present disclosure, as may be combined with one or more of the preceding paragraphs, will now be further described with reference to the drawings. Referring now to the drawings in more detail, FIG. 2 illustrates system 200 including a fluid bed reactor 210 and catalyst regeneration unit 220 external to fluid bed reactor 210. It is to be understood that fluid bed reactor 210 and catalyst regeneration unit 220 are not limited to the configuration of the embodiments shown in FIG. 2, and other configurations are contemplated herein. In general, the fluid bed reactor 210 depicts where the lipid feedstock could be introduced into the fluid bed reactor 210 through line 230. In an illustrative embodiment, the lipid feedstock is introduced into the fluid bed reactor 210 through line 230 as a spray through spray nozzles 235 or any other suitable means for introducing the lipid feedstock into the fluid bed reactor 210. However, it is to be understood, that fluid bed reactor 210 can be designed to have two or more feedstock injection points, namely, at least one for one lipid feedstock and at least one for another lipid feedstock or these feedstocks could be co-injected (by having them mixed upstream of the injection point). The particulate catalyst is injected into fluid bed reactor 210 from catalyst regeneration unit 220 via line 260, as a hot regenerated particulate catalyst as discussed below, i.e., a regenerated particulate catalyst is at an elevated temperature relative to the temperature of the spent catalyst. A gaseous stream via line 245 is used to fluidize the hot regenerated particulate catalyst in the fluid bed reactor 210 to form a hot regenerated fluidized particulate catalyst and may include a gas such as, for example, hydrogen, nitrogen, carbon dioxide, $H_2O$ (water vapor or steam), $C_1$-$C_4$ hydrocarbons (e.g., methane, ethane, propane or mixtures thereof), water, or a light off-gas isolated from the reactor effluent and optionally steam and may be superheated to provide heat input to the otherwise adiabatic reactor.

The gaseous stream introduced via line 245 to fluid bed reactor 210 and/or catalyst regeneration unit 220 can be saturated. For example, the pressure of the saturated steam can be from about 40 psi to about 150 psi. Alternatively, the gaseous stream introduced via line 245 to fluid bed reactor 210 and/or catalyst regeneration unit 220 can be superheated. The pressure of the superheated gaseous stream can be from a low of about 40 psi to a high of about 150 psi. The temperature of the superheated gaseous stream via line 245 can be about 300° F. to about 500° F.

In illustrative embodiments, the lipid feedstock and the hot regenerated fluidized particulate catalyst are subjected to reaction conditions as discussed above, e.g., a temperature of from about 400° C. to about 700° C., a pressure of from about 0 to about 10 MPa; a liquid hourly space velocity (LHSV) of from about 0.1 to about 10 $h^{-1}$ and for a time period ranging from about 10 minutes to about 10 hours or from about 10 minutes to about 5 hours, or from about 10 minutes to about 45 minutes, Within fluid bed reactor 210, the lipid feedstock is treated with the hot regenerated fluidized particulate catalyst to provide a hot reactor effluent comprising a liquid fraction comprising a bio-oil, which has a lower content of free fatty acids and impurities than the lipid feedstock, which leaves the fluid bed reactor 210 via line 265 and sent to a main fractionator (not shown).

During the reaction, coke will be formed in fluid bed reactor 210, catalytically or thermally, when the lipid feedstock is in contact with the hot regenerated fluidized particulate catalyst. The coke formed can be deposited on the surface of the hot regenerated fluidized particulate catalyst, thereby forming spent catalyst comprising the particulate catalyst and coke deposits, i.e., coked-catalyst particulates. The spent catalyst is continuously introduced to catalyst regeneration unit 220 via line 240 where the spent catalyst is subjected to coke burning conditions to burn most, if not all, of the coke from the spent catalyst and provide a hot regenerated fluidized particulate catalyst. The coke can be burned from the spent catalyst by exposing the spent catalyst to a stream such as an oxygen-containing gas stream, e.g., an inert gas/air via line 250 or a steam/air mixture via line 245 and 250, at appropriate high temperature and time duration conditions to burn off and remove substantially all coke deposits from the catalyst. In an illustrative embodiment, a temperature can range from about 450° C. to about 1000° C., and a time period can range from about 10 minutes to about 600 minutes. Accordingly, regenerating the spent catalyst generally comprises combustion of the spent catalyst in an oxidizing atmosphere to burn the coke deposits and redisperse active metal on the catalyst particles. Burning the coke is an exothermic process that can supply the heat needed for the reaction process. In a heat balanced operation, the quantity of coke formed on the catalyst is significant enough that no external heat source or fuel is needed to supplement the heat from coke combustion.

In the case where the amount of coke on the spent catalyst is insufficient and additional energy is required for heating the spent catalyst before recycling it to the fluid bed reactor 210, additional fuel may be provided in the catalyst regeneration unit. In an illustrative embodiment, additional heat can be provided to catalyst regeneration unit 220 by further introducing an optional support fuel to catalyst regeneration unit 220 via line 255. The optional support fluid can include, for example, light by-product gases formed during the reaction of the lipid feedstock with the hot regenerated fluidized particulate catalyst in the fluid bed reactor 210. Representative examples of light by-product gases include, but are not limited to, carbon monoxide (CO) and hydrogen as well as light hydrocarbons (e.g., methane, ethane, ethylene, propylene, propane, etc.)

The coke burn causes the spent catalyst to be heated to an elevated temperature, e.g., a temperature of from about 450° C. to about 1000° C., to provide a hot regenerated particulate catalyst relatively free or free of coke wherein the catalyst particles are heated. The hot regenerated particulate catalyst is continuously introduced to the fluid bed reactor 210 via line 260 where it is fluidized to form a hot regenerated fluidized particulate catalyst. The heat generated by the coke burn in the catalyst regeneration unit 220 is continuously transferred with the hot regenerated particulate catalyst to the fluid bed reactor 210. During the coke burn, the flue gas is continuously passed out of catalyst regeneration unit 220 via line 270. By continuously introducing the hot regenerated particulate catalyst to the fluid bed reactor 210, the lipid feedstock can be introduced into fluid bed reactor 210 at a temperature below the reaction temperatures discussed above.

While not shown in FIG. 2, it is understood that provisions are made for preventing the fluidized particulate catalyst from being swept out of the fluid bed reactor 210 with the reactor effluent or out of the catalyst regeneration unit 220 with the flue gas. Such provisions may include gas cyclones keeping the fluidized particulate catalyst in the reactor/catalyst regeneration unit, respectively, possibly supplemented with additional cyclones and other dust catching measures such as, for example, mechanical filters, filter bags and/or electrostatic filters serving to purify the flue gas from the catalyst regeneration unit and eject dust from the reactor effluent.

Figure 3:
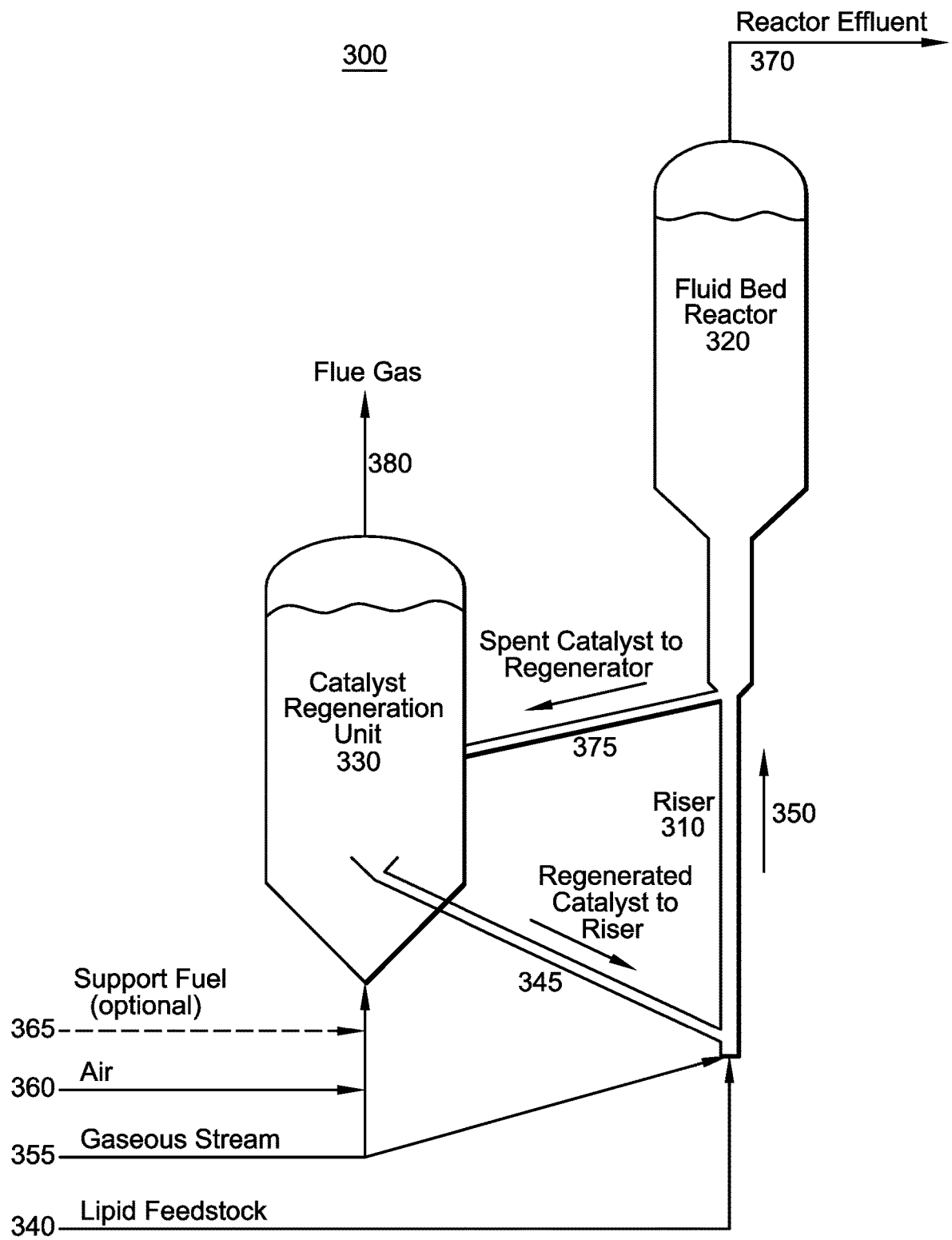
FIG. 3 illustrates a fluid bed reactor unit with a riser and a catalyst regeneration unit, in accordance with an illustrative embodiment.

The non-limiting illustrative embodiments of the present disclosure, as may be combined with one or more of the preceding paragraphs, will now be further described with reference FIG. 3 which illustrates system 300 including a riser 310 feeding into fluid bed reactor 320, and catalyst regeneration unit 330 external to riser 310 and fluid bed reactor 320. In the illustrative embodiment, riser 310 is operatively connected to a bottom portion of fluid bed reactor 320. This illustrative embodiment uses a reactor called a riser, essentially a pipe, in which the lipid feedstock, which enters via line 340, is combined with the hot regenerated particulate catalyst from catalyst regeneration unit 330 via line 345. In an illustrative embodiment, the lipid feedstock and hot regenerated particulate catalyst are present in the riser 310 for a time period ranging from about 5 seconds to about 60 seconds.

In an illustrative embodiment, the lipid feedstock and hot regenerated particulate catalyst can be introduced to riser 310 in the presence of gaseous stream via line 355 at the bottom of riser 310 in which the gas flow is sufficiently high to pneumatically transport the hot regenerated particulate catalyst into fluid bed reactor 320 via line 350 with the lipid feedstock, where the catalyst is fluidized as discussed above for the reaction of the lipid feedstock and hot regenerated fluidized particulate catalyst to proceed to completion. The gaseous stream can serve to suppress any coke formation and may also be used to add heat through super heating the steam. Injection of a superheated gaseous stream can lower the amount of regenerated fluidized particulate catalyst necessary as energy supply. The absence of the gaseous stream can increase the formation of coke which may be beneficial as the coke serves as a fuel in the catalyst regeneration unit 330. If additional energy is required for heating the fluidized particulate catalyst before recycling it to the fluid bed reactor 320 in the case where the amount of coke make is insufficient, additional fuel may be provided in the catalyst regeneration unit 330 via line 365 as discussed above.

In illustrative embodiments, the lipid feedstock and the hot regenerated fluidized particulate catalyst are subjected to reaction conditions as discussed above, e.g., a temperature of from about 400° C. to about 700° C., a pressure of from about 0 to about 10 MPa; a liquid hourly space velocity (LHSV) of from about 0.1 to about 10 h$^{-1}$ and for a time period ranging from about 10 minutes to about 10 hours or from about 10 minutes to about 5 hours, or from about 10 minutes to about 45 minutes. Within fluid bed reactor 320, the lipid feedstock is treated with the hot regenerated fluidized particulate catalyst to provide a hot reactor effluent comprising a liquid fraction comprising a bio-oil, which has a lower content of free fatty acids and impurities than the lipid feedstock, which leaves the fluid bed reactor 320 via line 370 and is sent to a main fractionator (not shown).

During the reaction, coke will be formed in fluid bed reactor 320, catalytically or thermally, when the lipid feedstock is in contact with the hot regenerated fluidized particulate catalyst. The coke formed can be deposited on the surface of the hot regenerated fluidized particulate catalyst, thereby forming spent catalyst comprising the particulate catalyst and coke deposits, i.e., coked-catalyst particulates. The spent catalyst is continuously introduced to catalyst regeneration unit 330 via line 375 where the spent catalyst is subjected to coke burning conditions to burn most if not all of the coke from the spent catalyst and provide a hot regenerated particulate catalyst. The coke can be burned from the spent catalyst by exposing the spent catalyst to a stream comprising an oxygen source such as air via line 360 and optionally steam via line 355 in catalyst regeneration unit 330. During the coke burn, the flue gas is continuously passed out of catalyst regeneration unit 330 via line 380. The hot regenerated particulate catalyst is continuously introduced to riser 310 via the line 345 where it is fluidized to form a hot regenerated fluidized particulate catalyst for further reaction of the lipid feedstock. By continuously introducing the hot regenerated particulate catalyst to the riser 310, the lipid feedstock can be introduced into fluid bed reactor 320 at a temperature below the reaction temperatures discussed above.

Figure 4:
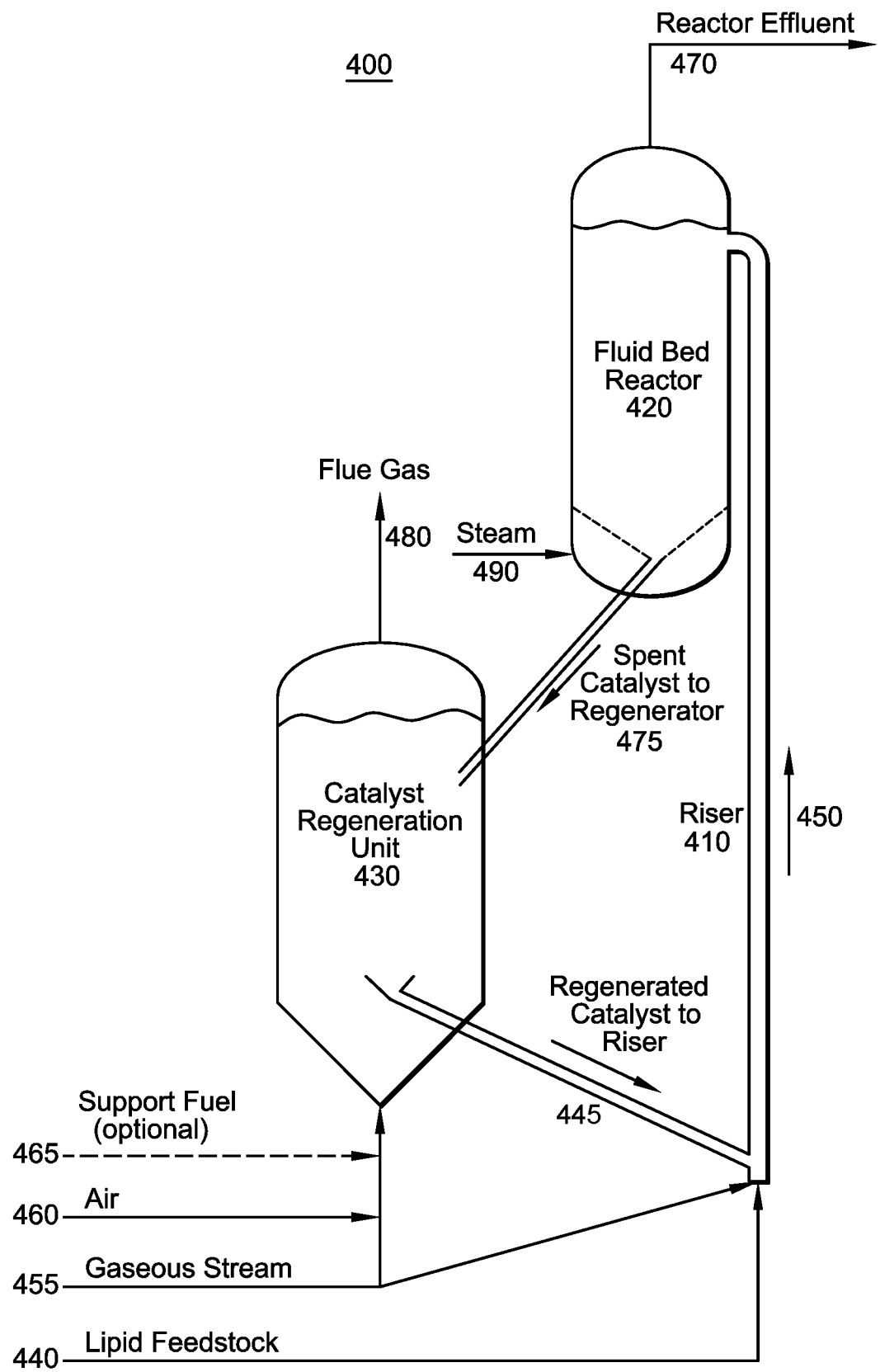
FIG. 4 illustrates a fluid bed reactor unit with a riser and a catalyst regeneration unit, in accordance with an illustrative embodiment.

The non-limiting illustrative embodiments of the present disclosure, as may be combined with one or more of the preceding paragraphs, will now be further described with reference FIG. 4 which illustrates system 400 including a riser 410 feeding into fluid bed reactor 420, and catalyst regeneration unit 430 external to riser 410 and fluid bed reactor 420. In the illustrative embodiment, riser 410 is operatively connected to a top portion of fluid bed reactor 420. This illustrative embodiment uses a reactor called a riser, essentially a pipe, in which the lipid feedstock, which enters via line 440, is combined with the hot regenerated particulate catalyst from catalyst regeneration unit 430 via line 445. In an illustrative embodiment, the lipid feedstock and hot regenerated particulate catalyst are present in the riser 410 for a time period ranging from about 5 seconds to about 60 seconds.

In an illustrative embodiment, the lipid feedstock and hot regenerated particulate catalyst can be introduced to riser 410 in the presence of gaseous stream via line 455 at the bottom of riser 410 in which the gas flow is sufficiently high to pneumatically transport the hot regenerated particulate catalyst into fluid bed reactor 420 via line 450 with the lipid feedstock, where the catalyst is fluidized as discussed above for the reaction of the lipid feedstock and hot regenerated fluidized particulate catalyst to proceed to completion. In an illustrative embodiment, the fluid bed reactor 420 further includes a line 490 for receiving another gaseous stream to assist in fluidizing the particulate catalyst. The gaseous stream can serve to suppress any coke formation and may also be used to add heat through super heating the steam. Injection of superheated steam can lower the amount of regenerated fluidized particulate catalyst necessary as energy supply. The absence of a gaseous stream can increase the formation of coke which may be beneficial as the coke serves as a fuel in the catalyst regeneration unit 430. If additional energy is required for heating the fluidized particulate catalyst before recycling it to the fluid bed reactor 420 in the case where the amount of coke make is insufficient, additional fuel may be provided in the catalyst regeneration unit 430 via line 465 as discussed above.

In illustrative embodiments, the lipid feedstock and the hot regenerated fluidized particulate catalyst are subjected to reaction conditions as discussed above, e.g., a temperature of from about 400° C. to about 700° C., a pressure of from about 0 to about 10 MPa, a liquid hourly space velocity (LHSV) of from about 0.1 to about 10 h$^{-1}$ and for a time period ranging from about 10 minutes to about 10 hours or from about 10 minutes to about 5 hours, or from about 10 minutes to about 45 minutes. Within fluid bed reactor 420, the lipid feedstock is treated with the hot regenerated fluidized particulate catalyst to provide a hot reactor effluent comprising a liquid fraction comprising a bio-oil, which has a lower content of free fatty acids and impurities than the lipid feedstock, which leaves the fluid bed reactor 420 via line 470 and sent to a main fractionator (not shown).

During the reaction, coke will be formed in fluid bed reactor 420, catalytically or thermally, when the lipid feedstock is in contact with the hot regenerated fluidized particulate catalyst. The coke formed can be deposited on the surface of the hot regenerated fluidized particulate catalyst, thereby forming spent catalyst comprising the particulate catalyst and coke deposits, i.e., coked-catalyst particulates. The spent catalyst is continuously introduced to catalyst regeneration unit 430 via line 475 where the spent catalyst is subjected to coke burning conditions to burn most if not all of the coke from the spent catalyst and provide a hot regenerated fluidized particulate catalyst. The coke can be burned from the spent catalyst by exposing the spent catalyst to a stream comprising an oxygen source such as air via line 460 and optionally steam via line 455 in catalyst regeneration unit 430. During the coke burn, the flue gas is continuously passed out of catalyst regeneration unit 430 via line 480. The hot regenerated particulate catalyst is continuously introduced to riser 410 via the line 445 where it is fluidized to form a hot regenerated fluidized particulate catalyst for further reaction of the lipid feedstock. By continuously introducing the hot regenerated particulate catalyst to the riser 410, the lipid feedstock can be introduced into fluid bed reactor 420 at a temperature below the reaction temperatures discussed above.

Various features disclosed herein are, for brevity, described in the context of a single embodiment, but may also be provided separately or in any suitable sub-combination. All combinations of the embodiments are specifically embraced by the illustrative embodiments disclosed herein just as if each and every combination was individually and explicitly disclosed. In addition, all sub-combinations listed in the embodiments describing such variables are also specifically embraced by the present compositions and are disclosed herein just as if each and every such sub-combination was individually and explicitly disclosed herein.

While the above description contains many specifics, these specifics should not be construed as limitations of the present disclosure, but merely as exemplifications of preferred embodiments thereof. Those skilled in the art will envision many other embodiments within the scope and spirit of the present disclosure as defined by the claims appended hereto.

What is claimed is:

1. A process, comprising:
   (a) processing a lipid feedstock over a fluidized particulate catalyst in a gas-based stream in a fluid bed reactor to obtain a processed stream and spent catalyst comprising coke deposits, wherein the processed stream includes a gaseous fraction and a liquid fraction comprising a bio-oil, wherein the bio-oil has a lower content of oxygen and impurities as compared to the lipid feedstock;
   (b) continuously introducing the spent catalyst comprising the coke deposits to a catalyst regeneration unit;
   (c) continuously operating the catalyst regeneration unit to burn off the coke deposits from the spent catalyst to obtain a regenerated particulate catalyst; and
   (d) continuously introducing the regenerated particulate catalyst from the catalyst regeneration unit to the fluid bed reactor.

2. The process according to claim 1, wherein the lipid feedstock comprises glycerides of at least one fatty acid selected from the group consisting of an acidulated soapstock, a fatty acid distillate from physical refining of plant oils or animal fats, a distiller corn oil from ethanol production, a waste cooking oil, lard, brown grease, yellow grease, trap grease, a waste fat, a low-grade oil, a supercritical water liquefaction oil, a plant oil, an animal fat, and any combination thereof.

3. The process according to claim 1, wherein the lipid feedstock comprises fatty acid methyl esters.

4. The process according to claim 1, wherein the lipid feedstock is partially decomposed and/or hydrolyzed.

5. The process according to claim 1, wherein the fluidized particulate catalyst comprises a metal selected from the group consisting of Na, K, Mg, Ca, Ba, Sr, Cr, Mo, Mn, Fe, Co, Ni, Cu, Zn, Al, rare earth metals, and any combination thereof, and an oxide support selected from the group consisting of alumina, silica, silica-alumina, titania, zirconia, and any combination thereof.

6. The process according to claim 1, wherein the fluidized particulate catalyst has an average particle diameter of about 0.05 to about 4 millimeters (mm).

7. The process according to claim 1, wherein the processing of the lipid feedstock over the fluidized particulate catalyst in a gas-based stream in the fluid bed reactor is carried out under reaction conditions comprising one or more of the following: a temperature in a range of from about 400° C. to about 700° C., a pressure in a range of from about 0.1 to about 10 MPa, and a liquid hourly space velocity in a range of from about 0.1 to about 10 $h^{-1}$.

8. The process according to claim 1, wherein processing the lipid feedstock over the fluidized particulate catalyst in the gas-based stream in the fluid bed reactor comprises introducing the lipid feedstock and the fluidized particulate catalyst in the gas-based stream at different injection points.

9. The process according to claim 8, wherein introducing the fluidized particulate catalyst in the gas-based stream comprising introducing the regenerated particulate catalyst from the catalyst regeneration unit to the fluid bed reactor in the presence of steam.

10. The process according to claim 1, wherein continuously operating the catalyst regeneration unit to burn off the coke deposits from the spent catalyst comprises introducing an oxygen source into the catalyst regeneration unit in the presence of heat.

11. The process according to claim 10, wherein the spent catalyst is heated to a temperature of about 450° C. to about 1000° C. to provide a hot regenerated particulate catalyst, and continuously introducing the hot regenerated particulate catalyst from the catalyst regeneration unit to the fluid bed reactor.

12. The process according to claim 1, wherein the fluid bed reactor further comprises a riser for initial contact between the lipid feedstock and the fluidized particulate catalyst in the gas-based stream, wherein the lipid feedstock and the fluidized particulate catalyst travel upwards through the riser together while the processing is initiated, and wherein the lipid feedstock and the fluidized particulate catalyst subsequently enter the fluid bed reactor.

13. The process according to claim 12, wherein the riser is operatively connected to a bottom portion of the fluid bed reactor.

14. The process according to claim 12, wherein the riser is operatively connected to a top portion of the fluid bed reactor.

15. The process according to claim 12, wherein the lipid feedstock and the fluidized particulate catalyst are in the riser for a time period of about 5 seconds to about 60 seconds.

16. The process according to claim 1, wherein the processing of the lipid feedstock over the fluidized particulate catalyst in the gas-based stream continues to completion in the fluid bed reactor.

17. The process according to claim 1, wherein the gas-based stream comprises one of hydrogen, nitrogen, carbon dioxide, a $C_1$ to $C_4$ hydrocarbon, water or mixtures thereof.

18. The process according to claim 1, wherein the regenerated particulate catalyst is free of coke deposits.

19. The process according to claim 1, further comprising subjecting the bio-oil to a catalytic hydroprocessing step to provide a hydroprocessed product.

20. The process according to claim 1, wherein the liquid fraction comprising a bio-oil contains less than about 0.5 ppm of chlorine.

* * * * *